US008320402B2

(12) United States Patent
Makino

(10) Patent No.: US 8,320,402 B2
(45) Date of Patent: Nov. 27, 2012

(54) BASE STATION FOR ALLOCATING SUB-CHANNELS TO MOBILE STATION

(75) Inventor: Satoshi Makino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 624 days.

(21) Appl. No.: 12/413,277

(22) Filed: Mar. 27, 2009

(65) Prior Publication Data
US 2009/0190546 A1    Jul. 30, 2009

Related U.S. Application Data

(63) Continuation of application No. PCT/JP2006/319532, filed on Sep. 29, 2006.

(51) Int. Cl.
*H04J 3/16* (2006.01)
(52) U.S. Cl. .......................... 370/465; 370/328
(58) Field of Classification Search .......... 370/328–329, 370/335–338, 341–344, 345, 348, 389, 395.2, 370/395.4, 437, 441–443, 465, 468
See application file for complete search history.

(56) References Cited

U.S. PATENT DOCUMENTS

| | | | |
|---|---|---|---|
| 6,631,124 B1 | 10/2003 | Koorapaty et al. | |
| 6,768,728 B1 * | 7/2004 | Kim et al. | 370/342 |
| 6,907,020 B2 * | 6/2005 | Periyalwar et al. | 370/337 |
| 6,909,704 B2 * | 6/2005 | Sakoda | 370/335 |
| 7,110,472 B2 * | 9/2006 | Sakoda et al. | 375/316 |
| 2003/0123414 A1 * | 7/2003 | Tong et al. | 370/337 |
| 2004/0166900 A1 | 8/2004 | Qiu et al. | |
| 2004/0174840 A1 * | 9/2004 | Yano et al. | 370/328 |
| 2005/0008026 A1 * | 1/2005 | Tanaka et al. | 370/437 |
| 2005/0053030 A1 * | 3/2005 | Zehavi | 370/328 |
| 2005/0202822 A1 | 9/2005 | Park et al. | |
| 2005/0245258 A1 | 11/2005 | Classon et al. | |
| 2005/0276242 A1 * | 12/2005 | Goto et al. | 370/328 |
| 2006/0002339 A1 * | 1/2006 | Niwano | 370/328 |
| 2006/0109931 A1 | 5/2006 | Asai et al. | |

(Continued)

FOREIGN PATENT DOCUMENTS

EP    1549093 A2    6/2005

(Continued)

OTHER PUBLICATIONS

Notice of Reason for Rejection dated Mar. 22, 2011 for Japanese application No. 2008-537349.

(Continued)

*Primary Examiner* — Chi H. Pham
*Assistant Examiner* — Kevin Mew
(74) *Attorney, Agent, or Firm* — Murphy & King, P.C.

(57) ABSTRACT

A base station for allocating one or more sub-channels to a mobile station to perform uplink wireless communication with the mobile station through the one or more sub-channels, including an estimation unit to estimate a propagation environment for radio waves from the mobile station to the base station; a calculation unit to calculate an interference amount based on a reception power at the base station apparatus; and a determination unit to determine a modulation method, an encoding ratio, and a number of sub-channels, which are to be used by the mobile station for transmission to the base station, based on the propagation environment, the interference amount, and specification conditions of the mobile station, to notify the mobile station of the modulation method, the encoding ratio, and the number of sub-channels.

12 Claims, 7 Drawing Sheets

U.S. PATENT DOCUMENTS

| | | | |
|---|---|---|---|
| 2006/0126577 A1* | 6/2006 | Yano et al. | 370/337 |
| 2006/0153061 A1 | 7/2006 | Nishio | |
| 2006/0176844 A1* | 8/2006 | Ogura | 370/328 |
| 2006/0198293 A1 | 9/2006 | Nishio et al. | |
| 2006/0246916 A1 | 11/2006 | Cheng et al. | |
| 2009/0016263 A1* | 1/2009 | Kishigami et al. | 370/328 |
| 2009/0161603 A1* | 6/2009 | Cheng et al. | 370/328 |
| 2010/0284326 A1* | 11/2010 | Oh | 370/328 |
| 2012/0120875 A1* | 5/2012 | Yano et al. | 370/328 |

FOREIGN PATENT DOCUMENTS

| | | |
|---|---|---|
| EP | 1646163 A2 | 4/2006 |
| JP | 10247955 | 9/1998 |
| JP | 2003018117 | 1/2003 |
| JP | 2003513588 | 4/2003 |
| JP | 2004214746 | 7/2004 |
| JP | 2004260467 | 9/2004 |
| JP | 2005012321 | 1/2005 |
| JP | 2005027107 | 1/2005 |
| JP | 2006135674 | 5/2006 |
| JP | 2006211210 | 8/2006 |
| WO | WO2004098092 | 11/2004 |
| WO | WO2005015801 | 2/2005 |
| WO | 2005020489 A1 | 3/2005 |

OTHER PUBLICATIONS

International Search Report dated Jan. 9, 2007.
Extended European Search Report dated Jun. 22, 2012 received in Application No. 06810911.5-2412/2068466.

* cited by examiner

FIG. 3

|  | REQUIRED CONDITION (COMMUNI-CATION SPEED) | WIRELESS ENVIROMENT (COMMON SIGNAL RECEPTION POWER) | MAXIMUM TRANS-MISSION POWER ($Tx_{max}$) | MODULATION METHOD & ENCODING RATIO |
|---|---|---|---|---|
| MOBILE STATION 1 | 1.2 Mbps | -57 dBm | 23 dBm | QPSK 1/2, 16QAM 1/2, 64QAM 1/2 |

FIG. 4

| | COMMON SIGNAL TRANSMISSION POWER | COMMON SIGNAL RECEPTION POWER | ENTIRE LOSS (Lp) | INTERFERENCE AMOUNT (Io) |
|---|---|---|---|---|
| MOBILE STATION 1 | 43dBm | -57dBm | 100dB | -98dBm |

| | ESTIMATED COMMUNICATION SPEED (Th) [Mbps] | | | REQUIRED TRANSMISSION POWER(Tx) [dBm] | | |
|---|---|---|---|---|---|---|
| THE NUMBER OF SUB-CHANNELS (N) | QPSK 1/2 SINR= 5.0dB | 16QAM 1/2 SINR= 10.5dB | 64QAM 1/2 SINR= 16.0dB | QPSK 1/2 SINR= 5.0dB | 16QAM 1/2 SINR= 10.5dB | 64QAM 1/2 SINR= 16.0dB |
| 1 | 0.20 | 0.40 | 0.60 | 7.00 | 12.50 | 18.00 |
| 2 | 0.40 | 0.80 | 1.20 | 10.01 | 15.51 | 21.01 |
| 3 | 0.60 | 1.20 | 1.80 | 11.77 | 17.27 | 22.77 |
| 4 | 0.80 | 1.60 | - | 13.02 | 18.52 | - |
| 5 | 1.00 | 2.00 | - | 13.99 | 19.49 | - |

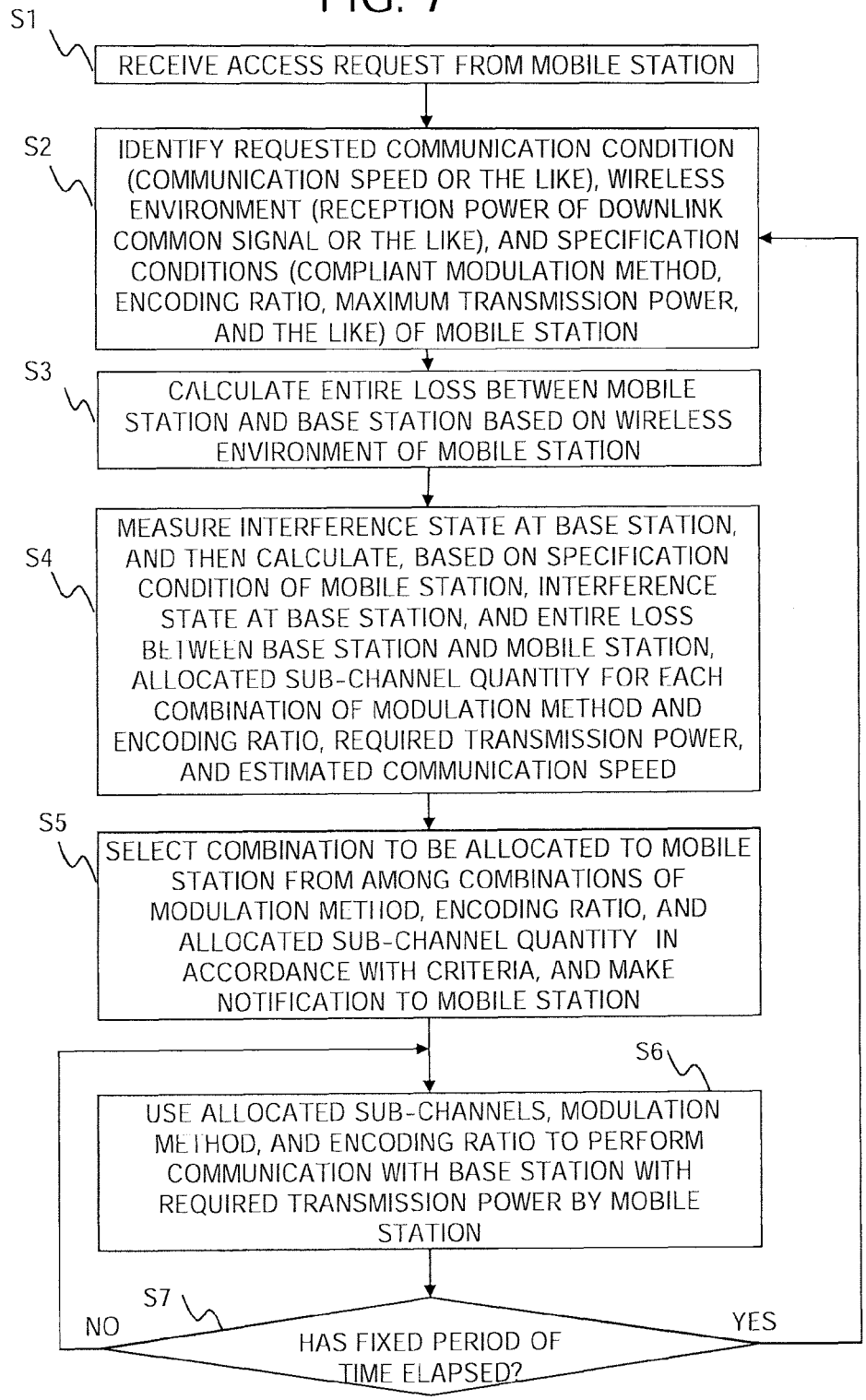

BASE STATION FOR ALLOCATING SUB-CHANNELS TO MOBILE STATION

CROSS-REFERENCE TO RELATED APPLICATION

This is a continuation of an International Application No. PCT/JP2006/319532, filed on Sep. 29, 2006, now pending, the entire contents of which are incorporated herein by reference.

FIELD

The present invention relates to a base station for allocating sub-channels to mobile station.

BACKGROUND

In an orthogonal frequency division multiplexing access (OFDMA) communication system, with regard to the downlink direction, a base station uses an entire available frequency band, and allocates sub-channels to a plurality of mobile stations, whereby signals are transmitted.

On the other hand, with regard to the uplink direction, mobile stations utilize sub-channels allocated to the respective mobile stations by a base station, and specified modulation methods and encoding ratios, whereby signals are transmitted.

By concentrating transmission power on the allocated sub-channel band alone, the mobile station is able to enhance a power spectral density, allowing its communication area to be expanded. However, if the number of sub-channels is made smaller and the sub-channel band is made narrower, a user communication speed declines.

Conventionally, there is a method of allocating sub-channels (bandwidths) based on communication requests associated with mobile stations (for example, Patent Document 1) However, in the conventional technology described in Patent Document 1, the system determines a bandwidth to be used by a mobile station such that the remaining available bandwidth is optimized. In other words, the object is to save the bandwidth as much as possible for other mobile stations to use. Accordingly, with the conventional technology, it has been impossible to effectively utilize available resources, and therefore to achieve improvement in communication speed and reduction in power consumption for the mobile station in communication.

Patent Document 1: JP 2003-513588 A
Patent Document 2: JP 2003-18117 A
Patent Document 3: JP 2004-214746 A In such a communication system as high speed downlink packet access (HSDPA), there is adopted an adaptive modulation method in which a modulation method is changed in accordance with the wireless environment. However, with such an adaptive modulation method, the frequency bandwidth is fixed, and hence consideration is not given to the influence from the change of the frequency bandwidth, which causes increase or decrease in transmission power spectral density.

Even with the OFDMA communication system, if the number of sub-channels is made smaller, and the number of sub-channels is assigned in a fixed manner, it is possible to expand the communication area. However, in such a case, even when the wireless environment is excellent because of a base station located nearby, only the communication speed is improved owing to the change of the modulation method.

If, in addition to the modulation method, the number of sub-channels is changed dynamically, the expansion of the communication area and the improvement in communication speed can be expected. However, appropriate allocation needs to be performed with regard to the modulation method and the number of sub-channels, and hence a new allocation method is demanded.

For example, if the allocation of sub-channels is not appropriate, with a more than necessary number of sub-channels are allocated with respect to the modulation method and encoding ratio specified for the mobile station, the power spectral density transmitted from the mobile station declines, and it becomes impossible to satisfy desired communication quality with respect to the modulation method and encoding ratio specified by the base station. Conversely, if the number of allocated sub-channels is insufficient, it is impossible to realize a maximum user communication speed that is originally expected to be achieved.

SUMMARY

An aspect of the present invention is a base station to allocate one or more sub-channels to a mobile station, and performs uplink wireless communication with the mobile station through the one or more sub-channels.

The base station includes:

an estimation unit to estimate a propagation environment for radio waves from the mobile station to abase station;

a calculation unit to calculate an interference amount based on a reception power at the base station; and a determination unit to determine a modulation method, an encoding ratio, and a number of sub-channels, which are to be used by the mobile station for transmission to the base station, based on the propagation environment, the interference amount, and specification conditions of the mobile station, to notify the mobile station of the modulation method, the encoding ratio, and the number of sub-channels.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 is a diagram illustrating a specific example of information that is notified by the mobile station;

FIG. 4 is a diagram illustrating specific examples of modulation methods, encoding ratios, and a number of allocated sub-channels;

FIG. 7 is a flowchart illustrating an example of operation that determines the modulation method, the encoding ratio, and the number of allocated sub-channels.

DESCRIPTION OF EMBODIMENTS

Hereinbelow, with reference to the drawings, an embodiment of the present invention is described. The configuration of the embodiment is merely an exemplification, and the present invention is not limited to the configuration of the embodiment.

(Outline of Embodiment)

Figure 1:
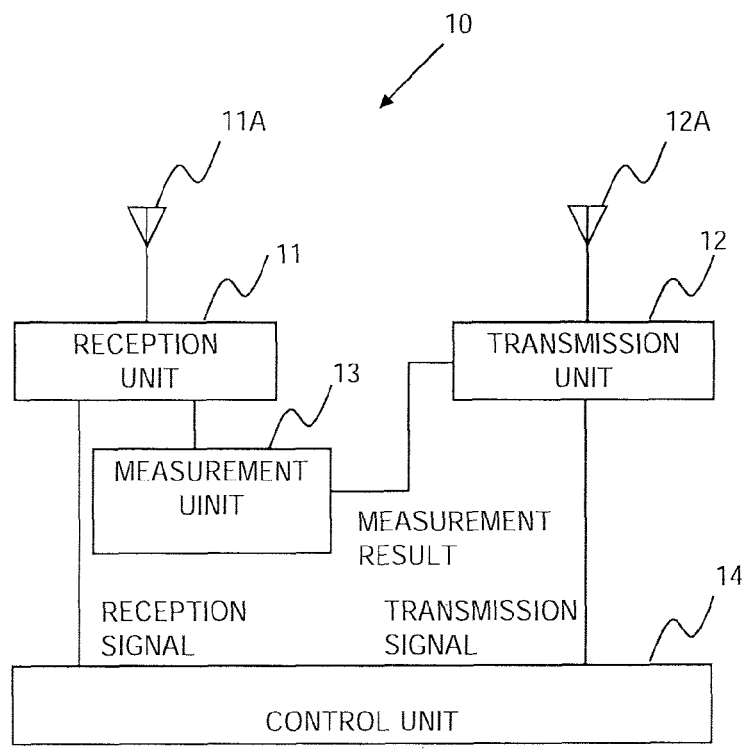
FIG. 1 is a diagram illustrating an embodiment of a mobile station.
Figure 2:
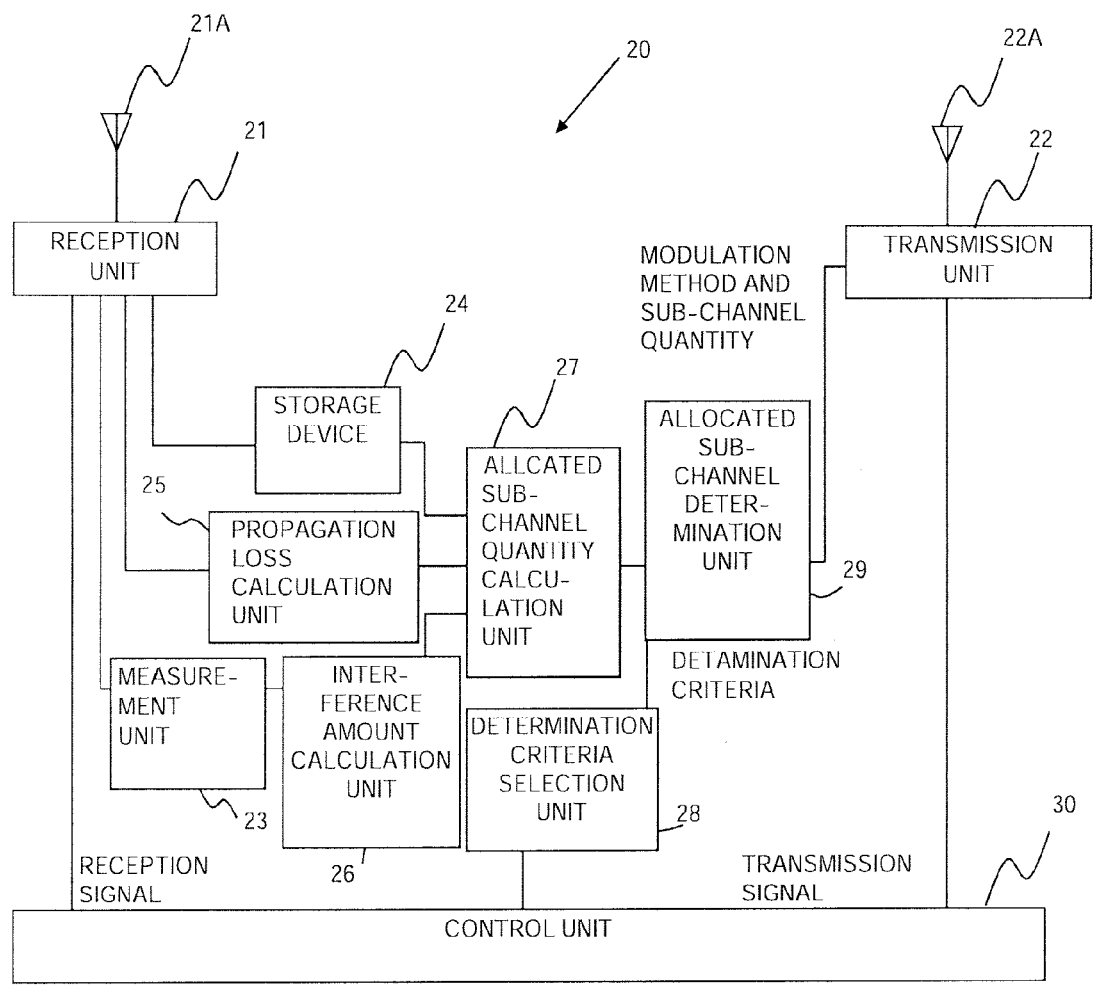
FIG. 2 is a diagram illustrating an embodiment of a base station.

In this embodiment, in order to select an appropriate modulation method, encoding ratio, and a number of sub-channels, the following means is used. Hereinafter, the number of sub-channels may be called "sub-channel quantity". FIG. 1 illustrates an embodiment (configuration example) of a mobile station (terminal apparatus) according to the present invention, whereas FIG. 2 illustrates an embodiment (configuration example) of a base station apparatus (multiple access system) according to the present invention.

(1) A mobile station 10 includes means (transmission unit 12) for notifying the base station of communication capacity information including a modulation method and encoding ratio that the mobile station is usable in the uplink direction, and a maximum transmission power. A base station apparatus (base station) 20 includes a storage device 24 to store the modulation method and encoding ratio that the mobile station 10 is usable, and the maximum transmission power, which are notified by the mobile station 10.

(2) The base station 20 includes means (transmission unit 22) for transmitting a common signal that is to be notified to all of the mobile stations 10 located within a communication area (cell). The mobile station 10 includes a measurement unit 13 to measure a reception power of the common signal notified by the base station 20, and means (transmission unit 12) for notifying the base station 20 of the measured common signal reception power. The base station 20 includes a loss calculation unit (propagation loss calculation unit 25) to calculate, based on the common signal reception power notified by the mobile station 10 and a transmission power of the common signal transmitted by the base station 20, an entire loss (radio wave propagation environment) between the mobile station 10 and the base station 20.

(3) The base station 20 includes a reception power measurement unit (measurement unit 23) to measure an entire reception power, and an interference calculation unit (interference amount calculation unit 26) to calculate an interference power (interference amount) from the entire reception power of the base station.

(4) The base station 20 includes an allocated sub-channel quantity calculation unit 27 to calculate all combinations of sub-channel quantities allocatable for the respective modulation methods and encoding ratios operable on the mobile station 10, a transmission power of the mobile station required when a particular sub-channel quantity among the all combinations of sub-channel quantities is used, and an estimated communication speed, based on a desired signal-to-interference and noise power ratio (SINR) which is required (determined) based on the calculated entire loss and interference power (interference amount), and the maximum transmission power and usable modulation methods and encoding ratios, which are notified by the mobile station 10.

(5) The mobile station 10 includes means (transmission unit 12) for notifying, when communicating in the uplink direction, the base station 20 of an access request including a required communication condition (communication speed or communication amount) with respect to the base station. The base station 20 includes a criterion selection unit 28 that selects, in accordance with the required communication condition of the mobile station 10 and resources of the base station 20, determination criteria used in determining the modulation method, encoding ratio, and sub-channel quantity that are to be allocated to the mobile station 10.

(6) The base station 20 includes an allocated sub-channel determination unit 29 to determine, in accordance with the determination criteria provided by the criterion selection unit 28, the modulation method and encoding ratio that are used by the mobile station 10 and the allocated sub-channel quantity being the number of sub-channels which is allocated.

(7) The base station 20 includes means (transmission unit 22) for notifying the mobile station 10 of the modulation method, encoding ratio, sub-channel quantity, and the transmission power that are used by the mobile station 10. The mobile station 10 includes means (transmission unit 12) for transmitting a signal to the base station 20 with the notified modulation method, encoding ratio, sub-channel quantity, and transmission power.

<Operation>

<1> Upon entering the network, the mobile station 10 transmits to the base station (network) a notification on capacity information including the modulation method, encoding ratio, and a maximum transmission power Txmax operable on the mobile station 10. The base station 20 receives that notification and then stores the notification in the storage device 24.

<2> In order to estimate a propagation environment for radio waves between the base station 20 and the mobile station 10, the mobile station 10 measures the reception power of the common signal transmitted from the base station 20, and then notifies the base station 20 of a reception power measurement result and a required communication speed when communicating in the uplink direction. The maximum transmission power can be notified simultaneously with the reception power measurement result and the required communication speed.

<3> Upon reception of a communication request (reception power measurement result of common signal and required communication condition (communication speed and maximum transmission power)) in the uplink direction of the mobile station 10, the base station 20 calculates an entire loss Lp between the base station 20 and the mobile station 10 based on the reception power measurement result and the transmission power of the common signal from the base station 20. Further, by using a measurement result of an interference power (interference amount) Io at the base station 20, the maximum transmission power of the mobile station 10, and required communication quality SINRj required for a combination j of the modulation method and the encoding ratio, the base station 20 calculates, with the following Expression 1 and Expression 2, all sub-channel quantities Nj allocatable to each combination j of the modulation method and the encoding ratio, a transmission power $Txj(Nj)$ of the mobile station 10 required when each sub-channel quantity Nj is used, and an estimated communication speed $Thj(Nj)$.

$$Txj(Nj)=Nj \times SINRj \times Lp \times Io (\leq Txmax) \quad \text{[Expression 1]}$$

$$Thj(Nj)=Nj \times Th\_subj \quad \text{[Expression 2]}$$

In Expression 2, Th_subj represents a communication speed in a case where one sub-channel is used for the combination j of the modulation method and the encoding ratio.

By calculating the expressions 1 and 2, it is possible to obtain a combination of the modulation method, the encoding ratio, and the sub-channel quantity, which may satisfy the required communication quality. From among the obtained one or more combinations, a combination that expands the communication area from the current state may be selected. The selected combination is notified to the mobile station 10, and with the mobile station 10 using the selected combination, it becomes possible to realize the expansion of the communication area through the sub-channel allocation while the required communication quality is satisfied.

<4> In accordance with the required communication speed of the mobile station 10, the sub-channel quantity available for the base station (number of sub-channels that are not in use), and the like, the base station 20 selects the determination criteria for determining a combination of the modulation method, encoding ratio, and sub-channel quantity that are to be used by the mobile station 10.

As the determination criteria, "maximization of communication speed", "observance of required communication speed", "minimization of transmission power", "maximum number of available sub-channels", and the like may be defined. A configuration in which only arbitrary one of those determination criteria is applied may be adopted. Alternatively, it may be possible to adopt a configuration in which arbitrary two or more of those determination criteria are selected, and the selected two or more determination criteria are given priorities to select one combination in accordance with the priorities.

<5> The base station 20 determines, based on the determination criteria, a combination J of the modulation method and encoding ratio that are to be used by the mobile station 10, and an allocated sub-channel quantity NJ (one combination of modulation method, encoding ratio, and sub-channel quantity), and then notifies the mobile station 10 of that one combination and a transmission power TxJ(NJ) required for satisfying the communication quality when that one combination is applied.

For example, when the priorities for the determination criteria are specified as "observance of required communication speed" and "minimization of transmission power" in the stated order, from among a plurality of combinations of the modulation method, the encoding ratio, and the sub-channel quantity, in accordance with the first priority, a combination that satisfies the required communication speed is selected (extracted). At this time, in a case where a plurality of combinations are extracted, in accordance with the second priority, a combination that minimizes the transmission power is selected.

<6> The mobile station 10 uses the combination (combination J of modulation method and encoding ratio and sub-channel quantity NJ) notified from the base station 20 to carry out communication with the notified transmission power TxJ (NJ).

<7> The propagation environment changes with time, and hence the base station 20 performs regularly (periodically) allocation of the modulation method, the encoding ratio, and the sub-channel quantity that are used by the mobile station 10 in the uplink direction.

(Details of Embodiment)

FIG. 1 is a diagram illustrating the embodiment of the mobile station that realizes the present invention. Referring to FIG. 1, the mobile station 10 includes a reception unit 11 connected to a reception antenna 11A, the transmission unit 12 connected to a transmission antenna 12A, the measurement unit 13, and a control unit 14.

Referring to FIG. 1, when communication is performed in the uplink direction, the mobile station 10 receives the common signal transmitted from the base station 20 at the reception unit 11 via the reception antenna 11A, and measures the reception power of the common signal at the measurement unit 13. A measurement result of the reception power is provided to the transmission unit 12. The control unit 14 provides, based on the reception signal, a transmission signal (capacity information of mobile station (wireless terminal)) including specification conditions (usable modulation method, encoding ratio, and the like) and the required communication conditions (communication speed, maximum transmission power, and the like) of the mobile station 10 to the transmission unit 12. The transmission unit 12 transmits a notification including the reception power measurement result, the specification conditions, and the required communication conditions to the base station 20.

FIG. 3 illustrates a notification example of the mobile station 10 (mobile station #1). The mobile station 10 transmits a notification including the communication speed, the maximum transmission power, the modulation method, the encoding ratio, and a wireless environment (reception power measurement result of common signal) to the base station 20.

FIG. 2 is a diagram illustrating the embodiment of the base station that realizes the present invention. Referring to FIG. 2, the base station 20 includes a reception unit 21 connected to a reception antenna 21A, the transmission unit 22 connected to a transmission antenna 22A, the reception power measurement unit 23, the storage device 24, the propagation loss calculation unit 25, the interference amount calculation unit 26, the allocated sub-channel quantity calculation unit 27, the criterion selection unit 28, the allocated sub-channel determination unit 29, and a control unit 30.

It should be noted that the propagation loss calculation unit 25 corresponds to an estimation unit of the present invention, and the allocated sub-channel quantity calculation unit 27 and the allocated sub-channel determination unit 29 correspond to a determination unit of the present invention.

The base station 20 receives an uplink request (access request) from the mobile station 10 at the reception unit 21 via the reception antenna 21A. The uplink request includes the above-mentioned notification (FIG. 3).

The notification (modulation method, encoding ratio, communication speed, common signal reception power, and the like) is held (stored) in the storage device 24. Further, the propagation loss calculation unit 25 obtains, based on the reception power measurement result included in the notification and the common signal transmission power of the base station 20, the entire loss Lp between the mobile station 10 and the base station 20 (corresponding to propagation environment). Further, the base station 20 measures the reception power (entire reception power) of the reception signal (uplink request) from the mobile station 10 at the reception power measurement unit 23, and then measures (calculates) the interference power Io at the interference amount calculation unit 26 based on the measurement result (entire reception power).

Further, the base station 20 uses the entire loss Lp, the measured interference power Io, and the maximum transmission power Txmax (stored in storage device 24) notified from the mobile station 10 (terminal) to calculate, at the allocated sub-channel quantity calculation unit 27, the sub-channel quantity Nj that satisfies the required communication quality (SINR) and the maximum transmission power for each combination j of the modulation method and the encoding ratio, and the transmission power Txj (Nj) that is required of the mobile station 10 when each sub-channel quantity Nj is applied and the corresponding estimated communication speed Thj (Nj). The allocated sub-channel quantity calculation unit 27 uses the above-mentioned [Expression 1] and [Expression 2] for calculating the transmission power Txj (Nj) and the communication speed Thj (Nj).

FIG. 4 is a table illustrating examples of the calculation result of the sub-channel quantity Nj, the transmission power Txj (Nj), and the communication speed Thj (Nj). Here, in FIG. 4, for simplification of description, the combination j of the modulation method and the encoding ratio is limited to only three categories (QPSK ½, 16 QAM ½, and 64 QAM ½), and assuming that the maximum number of sub-channels allocatable to the mobile station 10 is five, the communication speeds (Th_subj) at the time of using one sub-channel, which are used for the calculation of the estimated communication speed, are set to 0.2 Mbps, 0.4 Mbps, and 0.6 Mbps, respectively.

It should be noted that the communication speed at the time of using one sub-channel varies depending on the condition, but the ratio among the three categories of the combinations of the modulation method and the encoding ratio used as the examples is fixed (1:2:3). In the table of FIG. 4, by applying the combination J of the modulation method and the encoding ratio, and the allocated sub-channel quantity NJ (one combination of modulation method, encoding ratio, and sub-channel quantity), which satisfy the required communication quality, it is possible to realize the expansion of the communication area while satisfying the required communication quality.

Specifically, the calculation result as illustrated in FIG. 4 is input from the allocated sub-channel quantity calculation unit 27 to the allocated sub-channel determination unit 29. The allocated sub-channel determination unit 29 selects (determines), based on one or more determination criteria (selection conditions for combination of modulation method, encoding ratio, and sub-channel quantity) selected by the criterion selection unit 28, a combination to be used by the mobile station 10 from the calculation results (j, Nj). The combination thus determined is provided to the transmission unit 22 along with the required transmission power TxJ (NJ), and a transmission signal including the combination and the required transmission power TxJ(NJ) is transmitted toward the mobile station 10 from the transmission antenna 22A.

It should be noted that the type and the number of types of the determination criteria, which is selected by the criterion selection unit 28, and the priority order given to each determination criterion are changeable as necessary through, for example, control performed by the control unit 30. The estimated communication speed Txj (Nj) is referenced for determining a combination when the determination criteria relating to the communication speed is applied. Further, when the determination criteria "number of available sub-channels" is applied, the "number of available sub-channels" is increased or decreased in accordance with the number of sub-channels not in use at the base station 20.

The operation of the allocated sub-channel determination unit 29 is described in more details.

The wireless base station of FIG. 2 is compatible with a first modulation method capable of high-speed wireless communication (for example, 16 QAM) and a second modulation method capable of low-speed wireless communication (for example, QPSK), and uses, within the capacity range of the wireless terminal (mobile station), one or more and M (M is five in the above-mentioned example) or less sub-channels for wireless communication with the mobile station.

Referring to FIG. 4, when the SINR, which represents the quality of the reception signal at the mobile station, is 10.5, both the first modulation method 16 QAM and the second modulation method QPSK can be used. Further, when the desired communication speed is 0.8 [Mbps], referring to FIG. 4, it is possible to select a combination of the sub-channel quantity "4" or "5" (namely, the number of sub-channels is four or five) for the modulation method QPSK, and a combination of one of the sub-channel "2" to "5" (namely, the number of sub-channels is one of two to five) for the modulation method 16 QAM.

Here, when a comparison is made with regard to the transmission outputs, the transmission output is 15.51 [dBm] in a case of 16 QAM and the sub-channel quantity "2", whereas the transmission output is 13.02 in a case of QPSK and the sub-channel quantity "4", exhibiting a smaller required transmission output.

Accordingly, the allocated sub-channel determination unit 29 selects the sub-channel quantity "4" with QPSK, and performs control so that the selection result is notified to the mobile station from the transmission unit 22.

In this manner, even in a case where a modulation method with higher speed may be selected, by increasing the number of sub-channels and selecting a modulation method with lower speed, it is eventually possible to suppress the transmission output of the mobile station to a lower value.

Further, preferably, of the combinations of the modulation method QPSK and each of the number of sub-channels "4" and "5", and the combinations of the modulation method 16 QAM and each of the number of sub-channels "2" to "5", selection of a combination having the smallest transmission output (QPSK and the number of sub-channels "4" in this case) can achieve the minimization of the transmission output. In other words, the smallest transmission output is employed as the determination criterion.

Further, an upper limit (for example, 16 dBm) for such a transmission output as the maximum transmission output of the mobile station may be set, whereby a combination of the modulation method and the sub-channel quantity is selected within that range.

Similarly to the above-mentioned description, when the SINR is 10.5 dB, the sub-channel quantities "1" to "5" with the modulation method QPSK and the sub-channel quantities "1" and "2" with the modulation method 16 QAM satisfy the condition for the transmission output, but the communication speed is higher in the case of QPSK and the sub-channel quantity "5" than in the case of 16 QAM and the sub-channel quantity "1" or "2". Thus, the determination unit 29 selects the combination of QPSK and the sub-channel quantity "5", and performs control so that the selection result is notified to the mobile station from the transmission unit 22.

In this manner, even in the case where a high-speed modulation method can be selected as the modulation method, by increasing the sub-channel quantity and selecting a lower-speed modulation method as the modulation method, it is eventually possible to make the communication speed of the mobile station higher. Further, preferably, of the combinations of the modulation method QPSK and each of the sub-channel quantity "1" to "5" and the combinations of the modulation method 16 QAM and each of the sub-channel quantity "1" and "2", selection of a combination having the highest communication speed (QPSK and sub-channel quantity "5" in this case) can achieve the maximization of the communication speed. In other words, the highest communication speed is employed as the determination condition.

Figure 5:
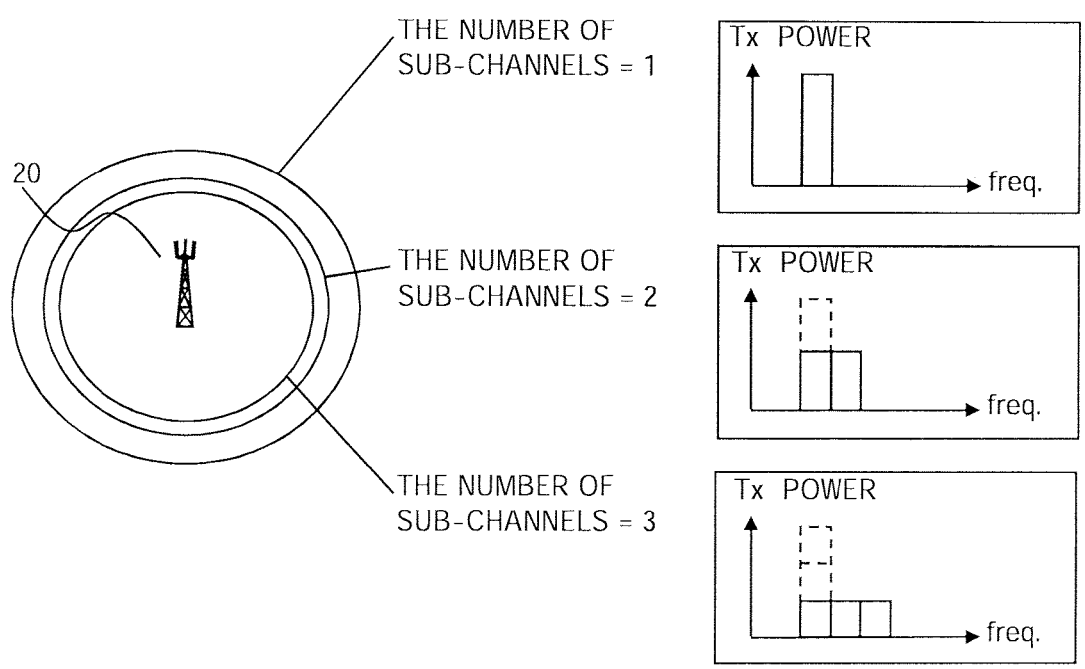
FIG. 5 is a diagram illustrating transmission power and the number of allocatable sub-channels that change in accordance with a propagation loss (distance) between the mobile station and the base station.

FIG. 5 conceptually illustrates a relation between the sub-channel quantity (the number of sub-channels) that varies depending on the distance between the base station 20 and the mobile station 10 (entire loss Lp) when one modulation method is used and the transmission power of the mobile station 10 that is required in such a case. As illustrated in FIG. 5, as the distance between the base station 20 and the mobile station 10 becomes shorter (the entire loss becomes smaller), it is more possible to satisfy the required communication quality even if the sub-channel quantity is increased. With this configuration, by increasing, in accordance with the calculation result of the entire loss, the sub-channel quantity within a range in which the required communication quality is satisfied, it is possible to achieve the improvement in communication speed.

Figure 6:
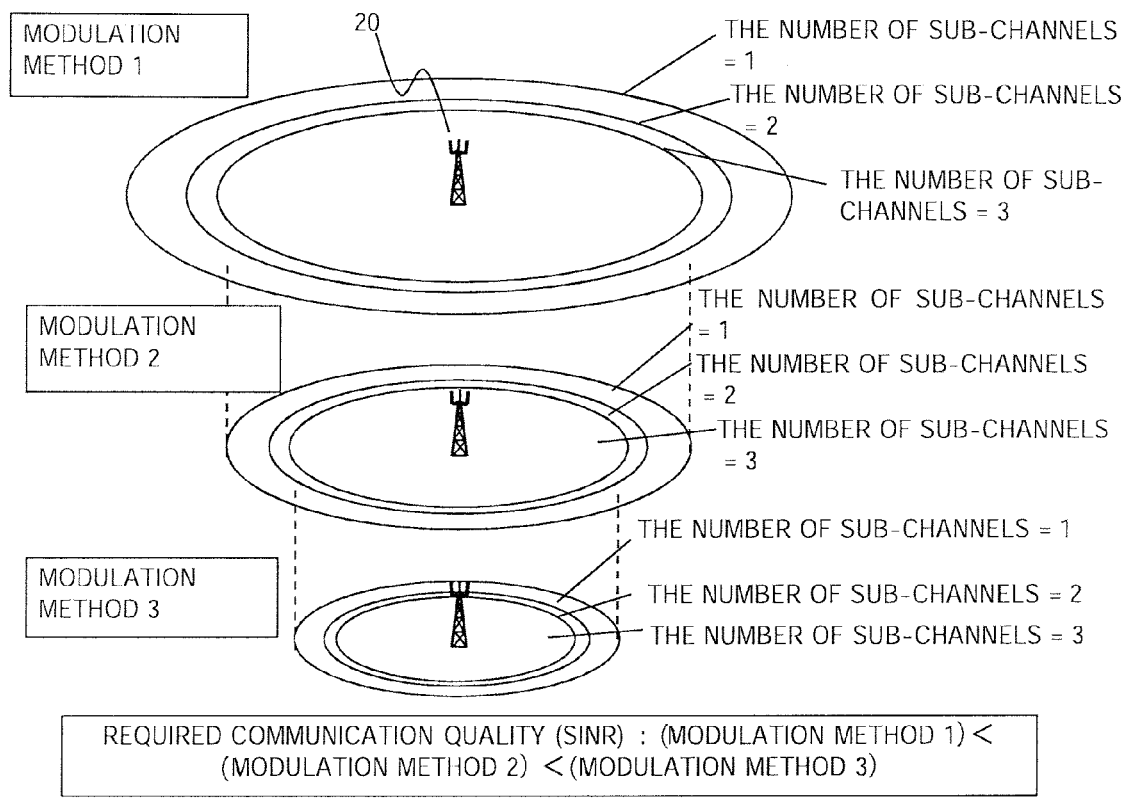
FIG. 6 is a diagram illustrating a coverage that changes in accordance with the modulation method, the encoding ratio, and the allocated sub-channel quantity.

FIG. 6 conceptually illustrates a relation between the distance (entire loss) between the base station 20 and the mobile station 10 when a plurality of modulation methods are used and the number of available sub-channels. As illustrated in FIG. 6, as the distance between the base station 20 and the mobile station 10 becomes shorter (the entire loss becomes smaller), a modulation method having higher required communication quality (SINR) can be used. Further, at a place where a modulation method with higher required communication quality can be used, more sub-channels can be used with a modulation method having lower required communication quality than that.

For example, when the "maximum number of available sub-channels (maximum: 4)", the "observance of required communication speed", and the "minimization of transmission power" are applied as the determination criteria, and when priorities are given to the "maximum number of available sub-channels (maximum: 4)", the "observance of required communication speed", and the "minimization of transmission power" in the stated order, referring to the calculation result of FIG. 4, the combinations of the modulation method, the encoding ratio, and the sub-channel quantity, which satisfy the required communication conditions (communication speed and maximum transmission power) are the following four combinations; "(16 QAM ½)×three sub-channels", "(16 QAM ½)×four sub-channels", "(64 QAM ½)× two sub-channels", and "(64 QAM ½)×three sub-channels". Of those, a combination with the smallest transmission power is "(16 QAM ½)×three sub-channels", and hence this combination is allocated to the mobile station #1 (mobile station 10: not illustrated).

On the other hand, when the "maximum number of available sub-channels (maximum: 5)", the "maximization of communication speed", and the "minimization of transmission power" are applied as the determination criteria, and when priorities are given to the "maximum number of available sub-channels (maximum: 5)", the "maximization of communication speed", and the "minimization of transmission power" in the stated order, referring to the calculation result of FIG. 4, a combination with the highest communication speed is "(16 QAM ½)×five sub-channels", and hence this combination is allocated to the mobile station #1 (mobile station 10: not illustrated). This combination is higher in communication speed and smaller in transmission power than the combinations that use "(64 QAM ½)".

In this manner, by changing the determination criteria, available resources (sub-channels) are utilized effectively, and hence it is possible to suppress the power consumption of the mobile station 10 and maximize the communication speed thereof.

In general, the propagation environment changes with time due to the movement of the mobile station 10 or the like. For this reason, it is required that the modulation method, the encoding ratio, and the sub-channel quantity, which are used by the mobile station 10 in the uplink direction, be allocated regularly (periodically).

FIG. 7 illustrates a flow of operation in which the modulation method, the encoding ratio, and the sub-channel quantity, which are used by the mobile station, are determined according to the embodiment of the present invention. As illustrated in the flowchart of FIG. 7, the base station 20 performs the calculation and the determination regularly in accordance with the propagation environment of the mobile station 10, and then determines the modulation method, the encoding ratio, and the sub-channel quantity, which are to be used by the mobile station 10.

The flow chart of FIG. 7 is described in detail. In Step S1 of FIG. 7, the base station 20 (FIG. 2) receives the access request (uplink request) from the mobile station 10 at the reception antenna 21A and the reception unit 21.

Prior to Step S1, the base station 20 transmits the common signal toward the communication area (cell) from the transmission unit 22 and the transmission antenna 22A. The common signal is used for the reception power measurement by the mobile station 10. The access request contains information including the reception power as the notification from the mobile station 10.

In Step S2, the base station 20 identifies, based on the notification contained in the access request, the required communication conditions (communication speed and the like), wireless environment (reception power of downlink common signal or the like), and specification conditions (modulation method, encoding ratio, maximum transmission power, and the like) of the mobile station 10. This processing is performed by, for example, the control unit 30, and is used for the determination of the determination condition (determination criteria).

In Step S3, the propagation loss calculation unit 25 uses the wireless environment (reception power of downlink common signal or the like) of the mobile station 10 to calculate the entire loss Lp between the mobile station 10 and the base station 20.

In Step S4, the interference condition (interference amount) Io at the base station is measured by the measurement unit 23 and the interference amount calculation unit 26. Subsequently, based on the specification conditions of the mobile station 10, the interference amount Io at the base station 20, and the entire loss Lp, the allocated sub-channel quantity calculation unit 27 calculates the allocated sub-channel quantity Nj corresponding to each combination j of the modulation method and the encoding ratio that can be used by the mobile station 10, the required transmission power Txj (Nj), and the estimated communication speed Thj (Nj). It should be noted that, in a case where the determination criteria relating to the communication speed is not used as the determination criteria, the calculation of the estimated communication speed may be omitted.

In Step S5, in accordance with one or more determination criteria selected by the criterion selection unit 28, the allocated sub-channel determination unit 29 selects a combination to be allocated to the mobile station 10 from among the combinations of the modulation method, the encoding ratio, and the allocated sub-channel quantity, which are calculated by the allocated sub-channel quantity calculation unit 27, and then transmits the selected combination using the transmission unit 22 and the transmission antenna 22A. By doing so, a signal containing the modulation method, the encoding ratio, and the sub-channel quantity, which are to be used by the mobile station 10 in the uplink communication, is notified to the mobile station 10.

In Step S6, the mobile station 10 (FIG. 1) receives at the reception unit 11 a signal of downlink communication from the base station 20. The reception signal received at the reception unit 11 is provided to the control unit 14. The control unit 14 controls the transmission unit 12 so that the uplink communication is performed with the modulation method, the encoding ratio, and the sub-channel quantity, which have been notified from the base station 20.

Then, after a fixed period of time has elapsed, the base station 20 performs the processing from Steps S2 to S5 again, and notifies the modulation method, the encoding ratio, and the sub-channel quantity, which are in accordance with the state of the mobile station 10.

In the example illustrated in FIG. 7, similarly to the case of the access request from the mobile station 10, the propagation loss between the base station 20 and the mobile station 10 calculated from the measurement result at the mobile station is used. However, considering that the communication is already in progress, it is also possible to calculate the allocated sub-channel quantity and the required transmission power for each combination of the modulation method and the encoding ratio, based on the reception state (SINR) of the sub-channel in communication at the base station 20, the sub-channel quantity used by the mobile station 10 for the communication, and the transmission power.

<Effect>

According to the embodiment of the present invention, by dynamically selecting (determining), in accordance with the propagation loss between the mobile station 10 and the base station 20, the interference amount at the base station 20, and the maximum transmission power of the mobile station 10, the modulation method and encoding ratio to be used and the number of sub-channels to be allocated, it is possible to realize the expansion of the coverage and the improvement in communication speed while satisfying the required communication quality.

Further, according to the embodiment of the present invention, through effective utilization of available resources (sub-channels), it is possible to reduce the power consumption of the mobile station and the interference to the surrounding base stations.

Here, in this embodiment, a description has been made of a multiple access communication system (base station) that is a communication system using orthogonal frequency division multiplexing (OFDM) as the modulation method and that realizes frequency division multiple access (FDMA) by allocating an arbitrary number of sub-channels to each user (mobile station). However, the method according to the present invention is applicable to a system which employs any other adaptive modulation method than OFDMA, a variable frequency bandwidth, and transmission power control.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A base station for allocating one or more sub-channels to a mobile station to perform uplink wireless communication with the mobile station through the one or more sub-channels, comprising:
    a processor to execute processes including:
        estimating a propagation environment for radio waves from the mobile station to the base station;
        calculating an interference amount based on a reception power at the base station apparatus; and
        determining a modulation method, an encoding ratio, and a number of sub-channels, which are to be used by the mobile station for transmission to the base station, based on the propagation environment, the interference amount, and specification conditions of the mobile station, to notify the mobile station of the modulation method, the encoding ratio, and the number of sub-channels,
    wherein the processor determines the modulation method, the encoding ratio, and the number of sub-channels, which satisfy a required communication condition for the transmission from the mobile station,
    wherein the processor determines the modulation method, the encoding ratio, and the number of sub-channels, which satisfy required communication quality that is required based on the interference amount, the required communication condition, and the specification conditions, and wherein:
    the specification conditions include a plurality of combinations of the modulation method and the encoding ratio, which the mobile station is usable; and
    the processor calculates, based on the propagation environment and the interference amount, a number of sub-channels that satisfies the required communication quality for each of the plurality of combinations of the modulation method and the encoding ratio to determine, as a combination to be notified to the mobile station, one of a plurality of combinations of the modulation method, the encoding ratio, and the number of sub-channels calculated.

2. The base station according to claim 1, wherein a transmission power at a time of applying the one of the plurality of combinations of the modulation method, the encoding ratio, and the number of sub-channels, which are determined by the processor, is calculated and notified to the mobile station.

3. The base station according to claim 1, wherein the processor determines one of the plurality of combinations of the modulation method, the encoding ratio, and the number of sub-channels, which satisfies the required communication quality and has a highest communication speed.

4. The base station according to claim 1, wherein the processor determines one of the plurality of combinations of the modulation method, the encoding ratio, and the number of sub-channels, which satisfies the required communication quality and has a communication speed that observes a required communication speed of the mobile station.

5. The base station according to claim 1, wherein the processor determines one of the plurality of combinations of the modulation method, the encoding ratio, and the number of sub-channels, which satisfies the required communication quality and enables the mobile station to have a smallest transmission power.

6. The base station according to claim 1, wherein the processor determines, in accordance with a plurality of determination criteria provided with a priority order, one of the plurality of combinations of the modulation method, the encoding ratio, and the sub-channel quantity.

7. The base station according to claim 6, wherein the priority order provided to the plurality of determination criteria is changed dynamically.

8. The base station according to claim 6, wherein the plurality of determination criteria include at least two of "maximization of communication speed", "observance of required communication speed", "minimization of transmission power", and "maximum number of available sub-channels".

9. A wireless base station included in a wireless communication system that is compatible with a first modulation method capable of high-speed wireless communication and a second modulation method capable of low-speed wireless communication, and uses, within a capacity range of a wireless terminal, one or more and M (M is a natural number) or less sub-channels for wireless communication with the wireless terminal, comprising:

a processor to execute processes including:

selecting a second combination if a first combination, which is a combination of the first modulation method and a number of sub-channels N ($1 \leq N \leq M$), and the second combination, which is a combination of the second modulation method and a number of sub-channels N' ($1 \leq N' \leq M$), both satisfy a desired communication speed, and if a required transmission output of the second combination is smaller than the required transmission output of the first combination; and notifying the wireless terminal of the selected combination.

10. The wireless base station according to claim 9, wherein the combination selected by the processor is a combination that has a smallest transmission output among combinations of a modulation method and a number of sub-channels, which satisfy the desired communication speed.

11. A wireless base station included in a wireless communication system that is compatible with a first modulation method capable of high-speed wireless communication and a second modulation method capable of low-speed wireless communication, and uses, within a capacity range of a wireless terminal, one or more and M (M is a natural number) or less sub-channels for wireless communication with the wireless terminal, comprising:

a processor to execute processes including:

selecting a second combination if a first combination, which is a combination of the first modulation method and a number of sub-channels N ($1 \leq N \leq M$), and the second combination, which is a combination of the second modulation method and a number of sub-channels N' ($1 \leq N' \leq M$), both have a transmission output equal to or less than a predetermined transmission output, and if a communication speed of the second combination is higher than the communication speed of the first combination; and notifying the wireless terminal of the selected combination.

12. The wireless base station according to claim 11, wherein the combination selected by the processor is a combination that has a highest communication speed among combinations of a modulation method and a number of sub-channels, which have transmission outputs equal to or less than the predetermined transmission output.

* * * * *